June 27, 1944.　　　　R. H. TRINKLE　　　　2,352,590

SMOKE OVEN

Filed April 5, 1940　　　3 Sheets-Sheet 1

ATTEST-

Robert H. Trinkle
INVENTOR

BY

ATTORNEY

June 27, 1944.  R. H. TRINKLE  2,352,590
SMOKE OVEN
Filed April 5, 1940  3 Sheets-Sheet 2

ATTEST -
Wm C. Meiser

Robert H. Trinkle
INVENTOR
BY Robyn Wilcox
ATTORNEY

Patented June 27, 1944

2,352,590

UNITED STATES PATENT OFFICE 2,352,590

SMOKE OVEN

Robert H. Trinkle, Chicago, Ill., assignor to Industrial Patents Corporation, Chicago, Ill., a corporation of Delaware Application April 5, 1940, Serial No. 328,081

9 Claims. (Cl. 99—229)

The present invention relates to a novel device for and a method of treating food products.

An object of the present invention is to provide a novel means for and method of conditioning comestibles such as meat products and the like.

Another object of the invention is to provide an apparatus in which and a method by which food products may be smoked, cured, dried and cooked in a continuous process.

Another object of this invention is to provide a smoke house for the simultaneous and automatic smoking and cooking of food products.

Another object of the invention is to provide means for improved air circulation in a smoke house.

Another object of the invention is to provide a treatment chamber for food products in which static pressure is automatically and uniformly held at a predetermined point.

Another object of the present invention is to provide a novel apparatus operable on the principle of a continuous circulating system embracing within its structure air passages including an enlarged chamber for the reception of comestibles to be treated, which incorporates means for introducing and controlling conditioning vapor used in the treating of the said food products.

Still a further object of the present invention is to provide a novel device for the treating of comestibles, such as meat products and the like, comprising a continuous air circulating system embodying means providing air flow passages including an enlarged treating chamber embodying within its structure novel means for uniformly treating the products within the said chamber in accordance with predetermined desired operating conditions.

Still another object within the purview of the present invention is to provide a novel means for, and method of, subjecting comestibles, such as meat products and the like, in an enclosed compartment forming part of a continuous flow circulating device, to a conditioning atmosphere adapted to encompass said products in a uniform enveloping movement whereby said conditioning atmosphere uniformly envelopes said products, and is uniformly applied to the surface thereof to produce uniformity in the processing of such products.

Another object embraced within the scope of the present invention is to provide a novel means for, and method of, treating food products, such as meat or the like, to produce uniformity in the resulting processed product, the said invention involving the use of a continuously operating circulating system to aerify a treatment chamber in which such product may be placed with a conditioning atmosphere in such a way as to provide for uninterrupted uniform flow of such conditioning atmosphere in enveloping relation to the said products without undesirable drafts in the said air in the vicinity of said products, whereby application of said conditioning atmosphere to the products is uniform.

A further object of the present invention is to provide a novel means for, and method of, conditioning food products and involves the use of a continuously operable circulating system for a conditioning atmosphere which is adapted to be projected into a treating chamber in the form of a uniformly flowing sheet in enveloping relation to the food products in the said chamber and to provide for uninterrupted uniform flow of said conditioning atmosphere throughout the treating region of the said chamber in a uniform enveloping movement around such product, and to maintain said conditioning atmosphere uniformly at predetermined operating conditions. More particularly, such means for, and method of, conditioning food products such as above mentioned contemplates the arrangement of the operating mechanisms controlling the distribution to and return flow of the conditioning atmosphere from the said treating chamber so as to produce the desired uniform flow thereof in the manner indicated, one illustration of such arrangement being constituted by the provision of means substantially at the same level in the said treating chamber for the introduction of the said conditioning vapor in the form of an elongated flow stream into the environment of the products in the treating chamber and the withdrawal thereof from said region of treatment, and creating a substantially uniform enveloping movement of the said conditioning air around such food product.

A still further object of the present invention is to provide a novel air pressure circulating system embodying the characteristics set forth above, and in addition to which is incorporated novel means remote from the treating chamber for regulating the pressure of the system and in such a manner as not to interfere in any way with the uniform application of the conditioning vapor to the products being treated in their normal enveloping and circulatory movement in the system. More particularly, such results are accomplished by providing pressure release means in the system on the return side of the said treating chamber whereby release of pressure can be effected without disturbing the normal flow of said conditioning atmosphere in the chamber, or otherwise causing undesirable vortical movements thereof in the environment of the products disposed in said treating chamber.

The invention also contemplates novel means in the air circulating system formed as a part of the flow distributing means associated with the treating chamber to provide for uniform flow characteristics of the conditioning gases introduced into the treating chamber in the environment of the products disposed therein, one illustrative example of such means as herein disclosed being adapted to project into the environment of the products in said chamber a rapidly and uniformly moving flow stream in the form of a sheet.

Still another object comprehended by the present invention is to provide in an air pressure circulating system for treating food products various means for introducing conditioning gases in controllable amounts to replenish and revivify the circulating conditioning atmosphere of the system and to control static pressure of the system in accordance with the introduction of said conditioning atmosphere.

Still a further object of the present invention is to provide in an air pressure circulating system of the type herein contemplated novel control means operable automatically in accordance with predetermined settings for controlling such conditioning factors as the pressure, temperature and humidity of the circulating atmosphere.

As a still further object of the present invention, novel means is contemplated for the various control mechanisms whereby the condition and character of the circulating atmosphere of the system can be controlled as desired and in accordance with the processing contemplated for the particular products being treated.

Numerous devices have been proposed from time to time for curing and smoking meat products. It has been proposed to simultaneously cook and smoke such a product, or otherwise combine in one structure means for carrying on two or more steps in the treatment of meat products. Such devices, however, have not operated satisfactorily as prior designers and operators did not fully understand the numerous factors upon which successful operation depends. The present invention relates to an apparatus in which all of these operations may be automatically and satisfactorily performed simultaneously, or in such sequence or combination as may be desired.

Although it has been generally recognized by those involved in the processing or conditioning of food products, and particularly meat and the like, that air conditioning principles could be used and are highly desirable in the processing of such products, nevertheless such devices as have been constructed heretofore to operate in accordance with such principles have had a measure of success only in the field, due principally to the failure to embody certain desirable and essential characteristics and features of such devices.

It is necessary, also, in constructing such a device to permit adjustment of the conditioning air as desired. Merely illustrative of the need for flexibility in the operation of such device, reference may be had to conditioned meat products, which, as is well known, vary in many ways, among which is their quality, texture, color and moisture content, all of which factors are determinative of a particular regulated process to be used in their treatment. This problem has been further complicated by the fact that even though the advantages of air conditioning procedures in their applicability to the conditioning of meat products have been generally recognized, nevertheless such structures as have evolved are seriously deficient in that instead of embracing one of the most essential requirements for the production of uniformly conditioned products, namely, uniform application of the conditioning gases to the product being treated, the same have merely relied upon the conventional uncontrolled introduction of such conditioning air into the system for the particular products undergoing treatment and the somewhat promiscuous application of such air to the products being treated. This results in the failure to produce uniformity in successive batches of the particular products undergoing treatment. Uniform characteristics of the process products is desired by all meat processors, and the like, to provide uniform standard characteristics for the particular processed products.

These processing procedures involve a multiplicity of steps including, for example, as pertaining particularly to the processing of meats, the heating of the said products for initial curing purposes, the subsequent introduction of moisture and smoke-laden air with a proper smoke ratio in the system, and the introduction of heated air for cooking of the particular products undergoing processing, any one or all of which may be carried out either alone or in combination, and either simultaneously or progressively, in accordance with the processing requirements. Such devices must of necessity, in order to operate in an effective and efficient manner, embody flexibility in their operating characteristics which, although recognized as a desirable desideratum in the field of operation, nevertheless has not been embodied in the developments of the prior art.

The present invention has, therefore, proceeded upon the theory of embracing within its scope the novel features and attributes of air conditioning devices and methods of operation, supplemented by particular consideration for the adaptability of such constructions and methods to the particular problems involved in the conditioning of comestibles, and particularly the processing of meat products, which require adequate and close control of temperature, humidity, smoke ratio and static pressure and the application of these conditioning agents to the said meat products, and the like, undergoing treatment. I have discovered that successful operation of such air conditioning devices require especially close and accurate control of static pressure within the device.

Other objects, features, capabilities and advantages are comprehended by the invention, as will later appear and as are inherently possessed thereby.

Referring to the drawings.

Figure 1:
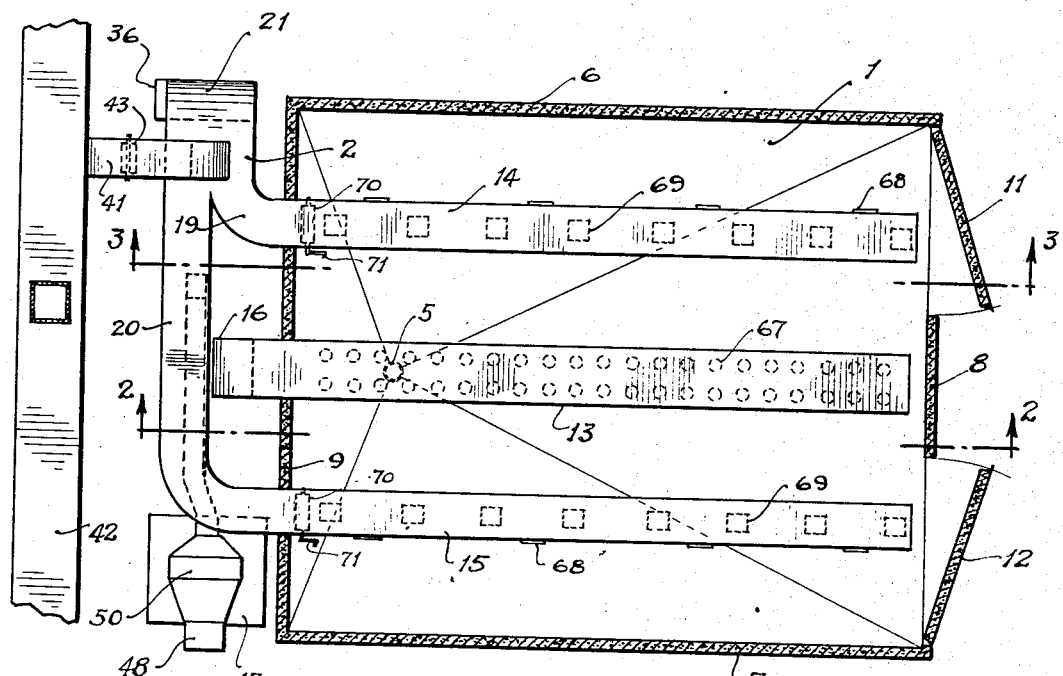
Figure 1 is a plan view, partly in section, of a device for treating food products in accordance with the present invention.
Figure 2:
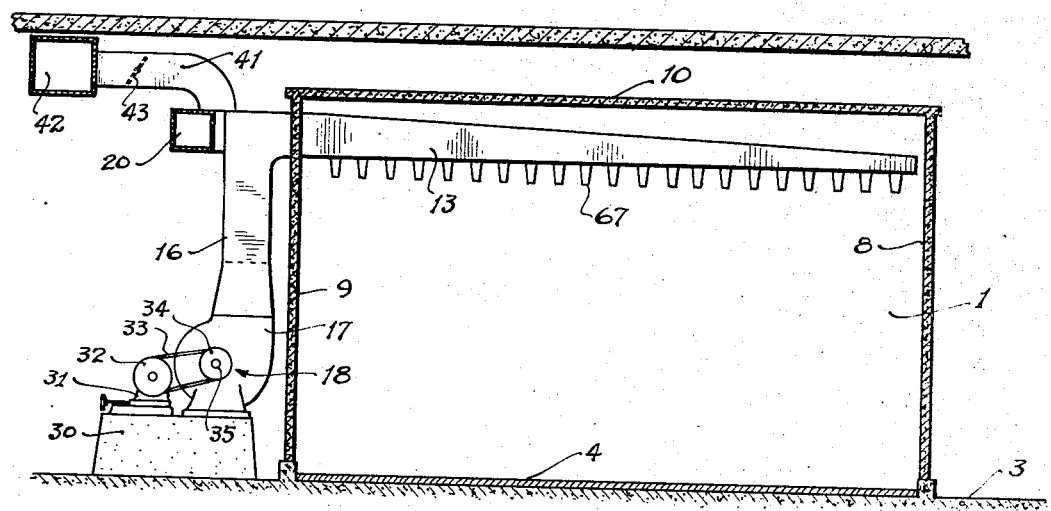
Figure 2 is a view in section taken in the plane represented by line 2—2 of Figure 1 of the drawings.
Figure 3:
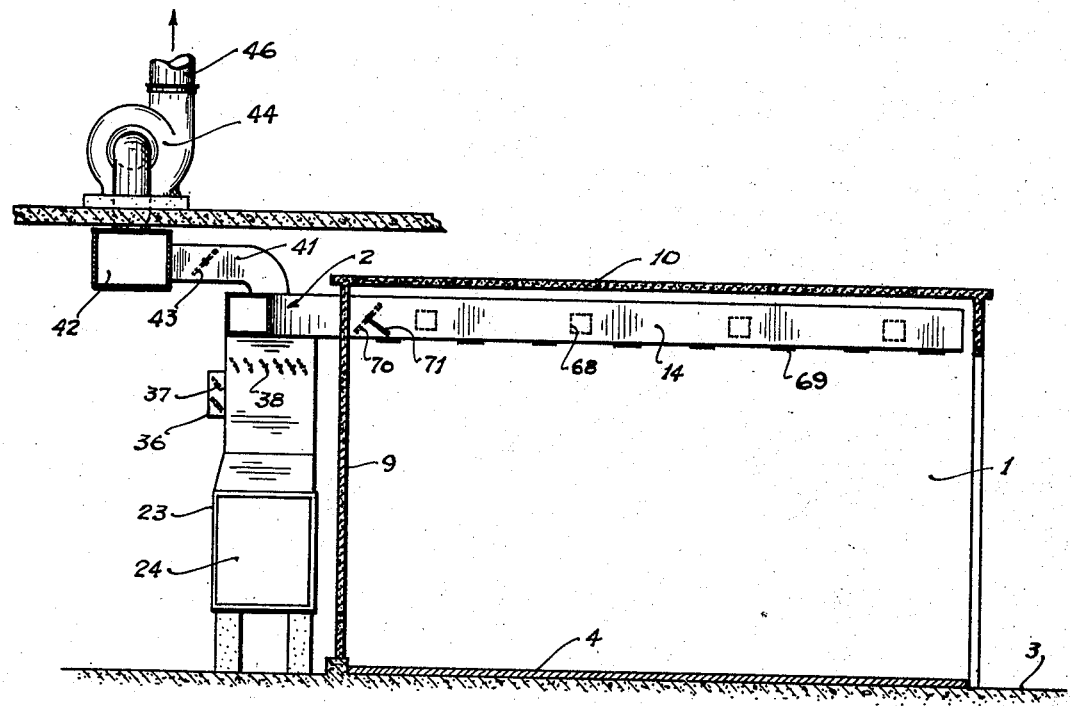
Figure 3 is a view in section taken in the plane represented by line 3—3 of Figure 1 of the drawings.
Figure 4:
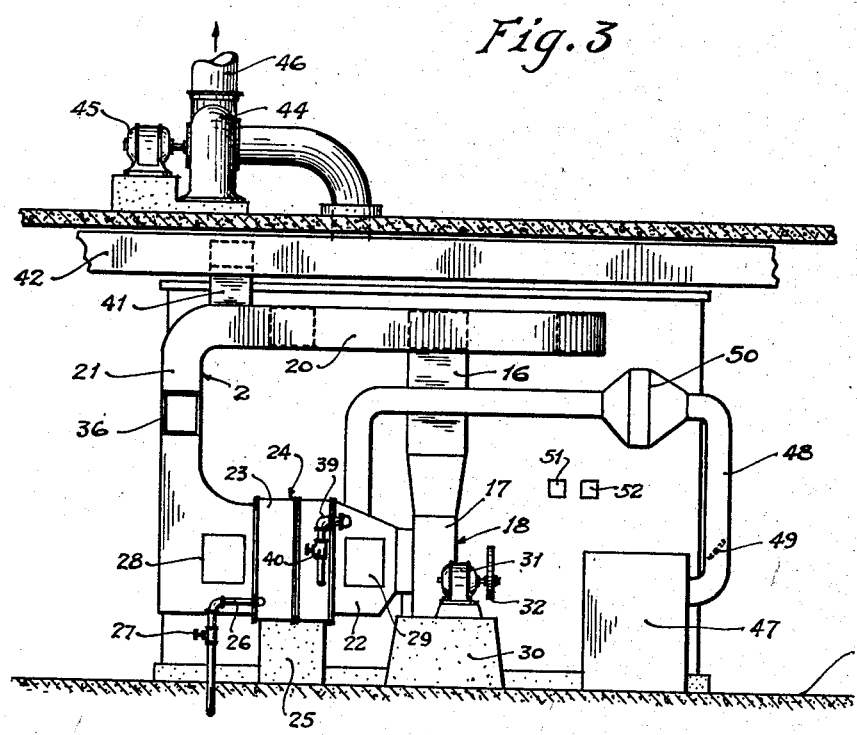
Figure 4 is a rear end view of the device shown in Figures 1 to 3, inclusive, of the drawings.

An embodiment selected to illustrate the present invention is disclosed in detail in the drawings. Briefly, it comprises an air circulating system embodying in its construction an enlarged chamber, or "smoke oven" 1, and air flow passages formed in part by circulating ducts, generally referred to as 2, communicating therewith, as will be later hereinafter more fully disclosed.

The device in accordance with the drawings is shown as mounted upon a suitable floor 3 as a support, the said chamber 1 having its floor surface 4 sloped as indicated in the drawings to merge with a drain 5 for the disposal of waste fluids, and particularly wash water used in cleansing the said floor 4 and the walls of the chamber 1. The chamber 1 is of box-like construction having opposed side walls 6 and 7 and front and rear walls 8 and 9 and a top wall or roof 10. The said walls may be of any suitable insulating material, such as "Cellotex" or "Insolite," covered with galvanized iron, and may be of unit panel construction to facilitate the assembly thereof, as well as disassembly of the same should it be found necessary to move the location of the oven. The front wall 8 is provided with hinged doors 11 and 12, whereby admittance into the chamber 1 is secured for the introduction of food products which may be transported by means of trucks or cages into the chamber 1 for treatment in accordance with the present invention.

The circulating system, according to the present embodiment, is formed in part by the flow ducts 2 comprising a supply or distributing duct 13 and the return flow maintaining ducts 14 and 15. Each of the said ducts extends into treating chamber 1 through the rear wall 9, and is located within the chamber adjacent to the roof 10. The said supply duct 13 is substantially centrally disposed in respect of said treating chamber 1, and communicates by way of a duct 16 with the discharge end of a fan casing 17 of a fan 18. The said return flow maintaining ducts 14 and 15 are disposed on each side of the said supply duct 13 approximately midway between such duct and the side walls 6 and 7, respectively, and both communicate by way of ducts 19 and 20, respectively, with a manifold 21. The manifold 21, in turn, communicates with the return duct 22 connected to the intake side of the fan housing 17. A housing 23 for a heater 24 upon the base or pedestal 25 is located between said manifold 21 and return duct 22. The heater 24 comrises steam coils or a radiator connected to a steam line 26 provided with a valve 27 for regulating the amount of steam admitted to the said heater 24. Access to the interior of housing 23 for adjusting the coils or the radiator, or to remove any collection of dust, dirt or other foreign material from the housing or heater, is obtained through closure members or doors 28 and 29. Adjacent pedestal 25 is another pedestal or base 30 adapted to support the fan housing 17 and a motor 31 having pulley 32 which, through the medium of a belt 33, drives pulley 34 mounted on the end of the shaft 35 of the fan rotor. The shaft 35 is journaled in suitable bearings, not shown, in the fan housing 17. Inasmuch as the invention contemplates the possibility of varying the air flow within the circulating system, the said motor 31 or fan 18 enclosed within housing 17 may be provided with means for varying the discharge of said air into the intake duct 16.

Manifold 21 is provided with a fresh air inlet 36, equipped with suitable valve means for adjusting the amount of fresh air admitted, such as dampers 37. I prefer to place mixing dampers 38 in manifold 21 and adjacent to dampers 37 in fresh air intake 36. Mixing dampers 38 and fresh air dampers 37 are connected by a suitable linking arrangement, not shown, so that when the fresh air intake dampers are closed the mixing dampers are completely open, and when the fresh air intake dampers are completely open the mixing dampers are partially closed, for example, at an angle of 35 or 40 degrees. I have found that the mixing dampers so linked to the fresh air intake dampers more thoroughly mixes the fresh air with that in the manifold and aids in the effective operation of the device.

A relatively large steam nozzle 39 is located in return duct 22, preferably intermediate the heater 24 and the air intake side of fan 18. This nozzle is also connected with the steam line 26, which connection is likewise equipped with a valve 40 for regulating the amount of steam admitted thereto.

Duct 41 connects manifold 21 with an exhaust duct 42. The connecting duct 41 is equipped with suitable valve means, such as damper 43. In most installations more than one smoke oven is required, in which case the exhaust duct 42 may serve the entire battery of ovens. The exhaust duct 42 connects with a fan 44, operated by a motor 45, the exhaust air being delivered to the outer atmosphere by any suitable means, such as duct 46.

Smoke for the smoke oven is supplied by smoke generator 47 connected with the return duct 22 by means of smoke duct 48. A manually operated damper 49 for regulating the amount of smoke entering the smoke oven, and a smoke filter 50 with which to filter out soot or other impurities is located in smoke duct 48.

Manifold 21 is also equipped with a temperature and a humidity regulating means 51, and the chamber 1 is equipped with a static pressure regulating means 52. Preferably each of these regulating means is adjustable from the outside of manifold 21 and chamber 1, so that the controls can be set by the operator from the outside.

Figure 5:
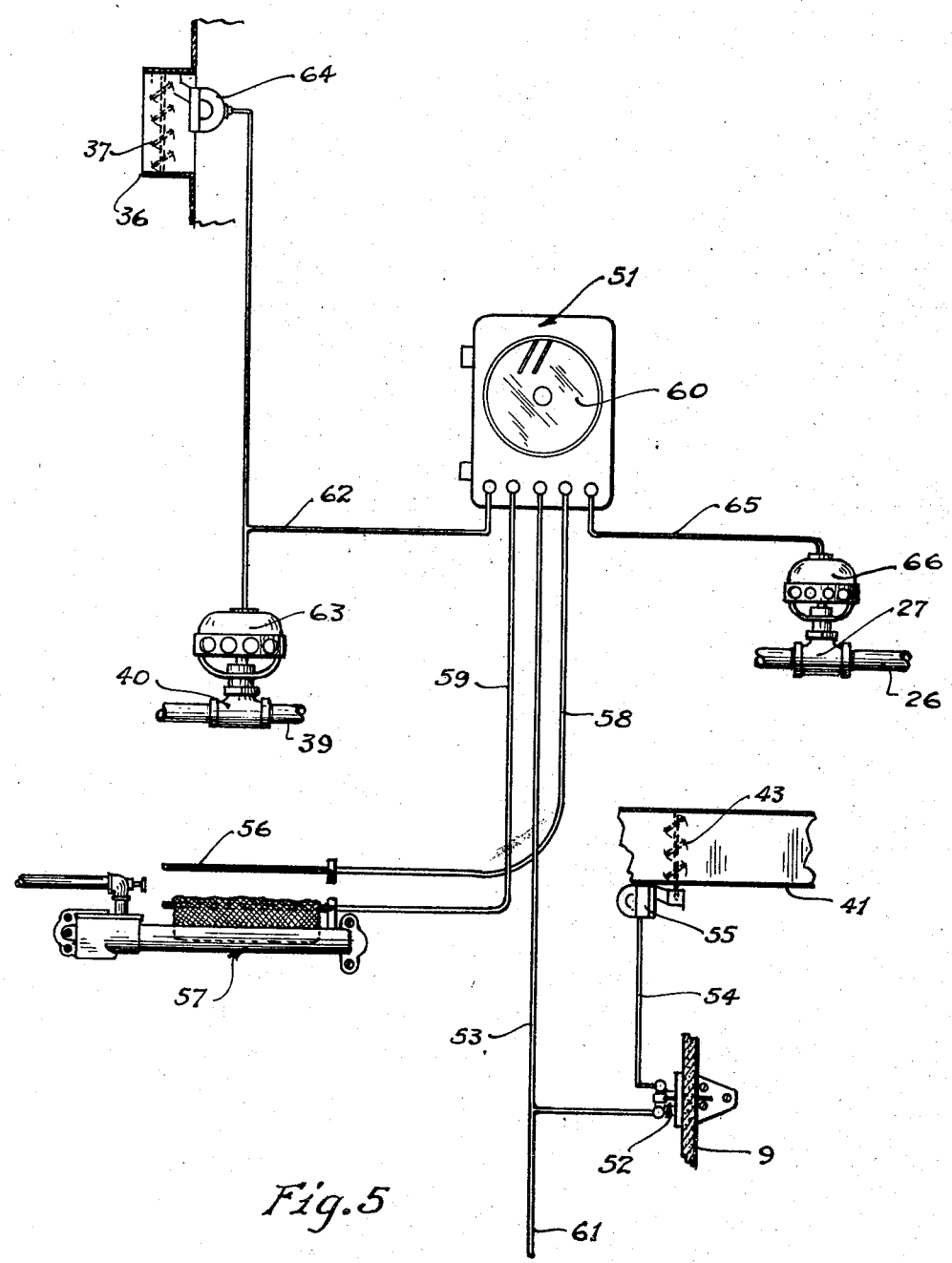
Figure 5 is a diagrammatic sketch of control mechanism for use in conjunction with the device according to Figures 1 to 4, inclusive, of the drawings.

A diagrammatic view showing the layout of the regulating instruments is shown in Figure 5. I prefer that these regulating means operate by compressed air which may be furnished by an air compressor, not shown. The static regulator 52 is located within the treating chamber 1, but should be set or controlled from the outside of the chamber 1, and should be located in some suitable place where the controls are easily accessible. An air line 53 connects the source of air pressure with the static pressure regulator 52, and a second air line 54 connects the regulator 52 with motor 55 which operates the damper 43 in the exhaust connecting duct 41, so that when the static pressure within the treating chamber 1 exceeds a predetermined figure, the damper 43 is automatically opened. I prefer that exhaust fan 44 operate continuously so that when the damper 43 is opened, atmosphere is withdrawn from the chamber 1, and the pressure therein reduced. So long as the static pressure within the said chamber 1 does not exceed the predetermined figure the damper 43 in the exhaust connecting duct 41 is closed. In practice the static pressure regulator 52 does not need to operate the fresh air damper 37 as the pressure is always increasing as long as the fan 18 is operating.

Suitable temperature and humidity regulator means 51 may comprise a dry bulb 56, a wet bulb 57, both located within the manifold 21. The dry bulb 56 and the wet bulb 57 connect by means of gaseous tubes 58 and 59, respectively, with a double pen recording regulator 60 which may be located in any suitable place, such as adjacent to the controls of the static regulator 52. This regulator 60 also connects with the source of air pressure by means of air line 61. The dry bulb 56 regulates the temperature of the air within the air circulating system 2, while the wet bulb 57 regulates the humidity therein. The wet bulb 57 operates a valve, not shown, within the regulator 60 which controls the air pressure in air line 62 connecting the regulator 60 with air motor 63, attached to the valve 40 regulating the amount of steam admitted to steam nozzle 39 and with air motor 64 which operates the damper 37 in the fresh air inlet 36. The motors 63 and 64 are installed to operate reversely to each other, so that when one is in operation, the other will be closed. For example, when the motor 64 opens the damper 37, steam valve 40 will be completely closed, and when the motor 63 opens the steam valve 40, the fresh air damper 37 will be closed. When the humidity falls below a predetermined figure, the valve 40 is opened and steam is admitted to steam nozzle 39 and thus into the return duct 22 until the desired humidity in the treating chamber 1 is reached. When the humidity within the treating chamber 1 reaches the desired point, the valve 40 is closed, and no further moisture is admitted to the treating chamber, or to the circulating ducts 2 until the humidity again falls below the desired point. If, on the other hand, the humidity is excessive, the fresh air dampers 37 are automatically opened, permitting fresh air to enter and bringing the humidity down to the desired point.

The dry bulb 56 operates a valve within the regulator 60 which controls the air pressure in air line 65, connecting the regulator 60 with a motor 66, which, in turn, operates the valve 27 on the steam line 26 supplying steam to the heater 24. When the temperature within the manifold 21 is lower than a predetermined figure, steam is admitted to the heater 24, heating the air as it flows through the circulating system. When the temperature gets to the predetermined point the valve 27 shuts off the supply of steam to the heater 24. In practice, no special means for cooling the air is necessary as abrupt changes are undesirable, and the system will always lose heat. By using anticipating type controls a very close and accurate regulation is secured.

During operation of the air circulating system above described, the rotor of fan 18 forces the conditioning atmosphere into duct 16 to be discharged into the chamber 1 through the distributing duct 13, after which the same is returned through the return flow maintaining ducts 14 and 15, the manifold 21, the return duct 22, and into the intake side of the fan 18, and is again recirculated in the manner indicated.

The present invention is particularly concerned with the proper distribution of the flow of conditioning air in the chamber 1. As a part of said distributing system the said supply duct 13 extends substantially throughout the length of the treating chamber 1, and is approximately centrally disposed in said chamber and is located adjacent to the ceiling 10 thereof. It is provided with a series of nozzles 67, two rows being disclosed. The row of nozzles 67 on the side of the supply duct 13, which is adjacent to return duct 14, is adapted to distribute the circulating air in the form of a sheet into the environment of the food products disposed within chamber 1 and substantially beneath the return duct 14, and the other row of nozzles 67 is likewise adapted to operate in a similar manner for projecting the air in the form of a sheet into the environment of other food products to be treated disposed within the treating chamber 1 and substantially beneath the return flow maintaining duct 15. This arrangement of the nozzles, however, may be modified as desired, to effect the results in accordance with the invention, and the arrangement as herein depicted is merely one illustration of a construction in accordance with the present invention. Inasmuch as the present invention is predicated upon a desire to uniformly treat the food products within the treating chamber 1, it is highly desirable to provide a projected sheet of said conditioning atmosphere having substantially uniform flow throughout the extent thereof, and accordingly the said supply duct has its cross sectional area gradually decreased from adjacent the rear wall 9 forwardly toward the front of the chamber 1, whereby constant pressure is maintained throughout the entire length thereof to provide for this uniform flow.

The said return flow maintaining ducts 14 and 15 are each located laterally of the supply duct 13 and are substantially of the same length as said duct 13. These return ducts are disposed at substantially the same level as duct 13, and are approximately midway between such supply duct 13 and the side walls 6 and 7, respectively. Each of said return ducts is provided with a plurality of openings 68 on the side opposed to the supply duct 13, and similar openings, such as 69, on the bottom thereof and between the said openings 68. The openings may be controlled by slide dampers, not shown, or the like, for regulating the flow capacity of the said ducts. Furthermore, each of the return ducts may be provided adjacent rear wall 9 with a valve means, or damper, such as 70, whereby each duct may be completely closed to prevent passage of air therethrough, which damper may be controlled by a quadrant 71, or other suitable means, manually manipulable from the exterior of the duct.

In accordance with the present invention, the return ducts 14 and 15 are so located in respect of the supply duct 13 that the circulating movement of the air within the chamber 1 takes place to produce uniformity in the circulation of conditioning atmosphere around each of the food products which may be placed in the treating chamber 1. Illustrative of the manner in which circulation of air takes place within the treating chamber 1, reference may be made to one only of the return ducts such as 14, inasmuch as the circulation of air within the system on each side of the supply duct takes place in a similar manner. According to the operation of the circulating system illustrated, the flow of air into the supply duct under the pressure maintained by operation of the fan results in the rapid ejection of the said air through the nozzles 67 to produce a flow sheet projecting down into the environment of the food products being treated in the chamber 1. The normal movement of this flow sheet in the immediate environment of the said products is laterally in an enveloping movement of substantial depth to encompass the said food products, and to cause normal circulatory movement of the said air laterally and upwardly toward the return duct 14. The circulating air in the system is returned to the intake side of the fan 18 through the openings 68 and 69 of the return flow maintaining duct 14. This is a continuous operation under normal operating conditions, and this circulatory enveloping movement of the projected air takes place under uniform flow, free from vortical or other disturbances so that the food products are uniformly treated with the said conditioning air enveloping the same, as will be later more fully disclosed.

In order to regulate the pressure within the treating chamber 1 without disturbing the normal uniform flow of the conditioning air therein, provision has been made to relieve such pressure by the pressure release means heretofore described, including the exhaust duct 42 connecting with the manifold 21. Thus, by proper operation of the damper 43, the exhausted atmosphere is removed from the system remote from the treating chamber 1. Pressure within the device can, therefore, be regulated without causing vortical movement or whirls within the conditioning air of the treating chamber 1.

In operation, the device illustrative of the present invention is loaded with product to be processed, such as sausage, which is brought in loaded on racks or sausage sticks, carried by cages or trucks. These are placed so that the center of the cage or truck is approximately underneath the return ducts 14 or 15. The doors 11 and 12 are then tightly closed and the controls for the temperature, humidity and pressure regulating means are set by the operator. Ordinarily, products such as sausage will be kept in a dry smoke at an elevated temperature for a period, after which the temperature is raised, and the relative humidity increased, and these conditions maintained for another period while the product is completely processed. Temperature, relative humidity and static pressure within the oven are controlled automatically at any desired level at any time by the operator changing the controls on the regulators 51 and 52.

Conditioning atmosphere, comprising in the main smoke-laden air, is circulated in the system as described above to uniformly envelop the products in the treating chamber 1. Under normal operating conditions, such uniformity of application of the said conditioning air to the products is accomplished by maintaining a high velocity of discharge for the same at the discharge nozzles, usually approximately two thousand feet per minute, or lesser, or greater, as conditions warrant.

Said smoke laden air is withdrawn from the treating chamber 1 through the openings 68 and 69 in return ducts 14 and 15, and then passes through the heater 24, where it is heated to the desired temperature before again passing through the fan 18 and again returning to the treating chamber 1. By means of this recirculation the desired temperature is maintained inside the oven, and smoke and heated air is not wasted. On the other hand, if the temperature becomes excessive, the valve 46 regulating the supply of steam to the heater 24 automatically closes and the oven begins to cool gradually. Smoke is generated in the smoke generator 47 and is pulled out through the duct 48 by the fan 18, and is mixed with the smoke-laden air being circulated in the oven, to revivify and reactivate the same.

Control of the introduction of smoke into the system is affected by the damper 49 which may be manually manipulated to secure the proper smoke ratio in the circulating atmosphere of the system.

The desired relative humidity inside the chamber 1 is maintained by the admission of steam through steam nozzle 39 and fresh air through inlet 36. If the humidity in the chamber 1 is raised above the desired point, the fresh air inlet damper 37 automatically opens, permitting fresh air to enter and bringing the humidity down to the desired point. If, on the other hand, the humidity drops below the desired point, the steam valve 40 automatically opens and admits live steam through the steam inlet 39 which builds up the humidity to the desired point. By the intermittent operation of the fresh air damper and the live steam valve the relative humidity inside the treating chamber 1 can be maintained at any desired point.

As fresh air is pulled in through inlet 36 and smoke through duct 47, a pressure is created inside the chamber 1 which, when the predetermined point is reached, is relieved through exhaust damper 43.

As above described, location of the pressure exhaust means in remote relation to the treating chamber makes for more uniform treating conditions in the said chamber, inasmuch as the movement and circulation of the conditioning atmosphere of the system is unaffected by release of such atmosphere thereof from the treating chamber. Release would otherwise cause vortical and other objectionable eddies and cross currents to be set up in the vicinity of the products, thus leading to lack of uniformity in the treatment of said products.

While I have herein described, and in the drawings shown, an illustrative embodiment of the invention, it is to be understood that the invention is not limited thereto, but may comprehend other constructions, arrangements of parts, details, features and method steps without departing from the spirit of the invention.

I claim:

1. In a device for treating comestibles, the combination of an air pressure circulating system formed in part by an enlarged comestible receiving chamber and in part by supply and return flow maintaining means communicating with said enlarged comestible receiving chamber, said supply means having means for discharging air into said chamber in enveloping relation to comestibles disposed in said chamber, said return flow means being disposed in relation to said supply means for maintaining said enveloping circulatory movement of said fluid body in said chamber, means for introducing air into said system to supplement the air circulating therein, means for regulating the pressure of said air in said system, means for supplying a vapor into said system, means for heating the circulating air in said system, and automatically operable means for controlling the said pressure regulating means, air and vapor supply means, and said heating means to condition the said air within the system in accordance with predetermined operating requirements.

2. A device for treating comestibles, comprising an insulated chamber, means for continuous circulation of heated, smoke-laden air in said chamber, and its removal therefrom, said means including air conditioning means comprising a smoke generator, a fresh air inlet, means for heating said air and smoke, a steam nozzle, and a fan, and ducts connecting said air conditioning means with said chamber, and means remote from said chamber for automatically maintaining a desired static pressure therein in response to the differential pressure between the inside and outside of said chamber.

3. A smoke oven comprising an insulated chamber, means for introducing into, and circulating within, said chamber conditioned comestible treating air and removal therefrom, and for reintroducing the same into said chamber, said means comprising a supply duct centrally disposed in said chamber, adjacent to the ceiling thereof and extending substantially the length of the oven, which supply duct is equipped with a plurality of downwardly pointing nozzles, return ducts provided with a plurality of openings and located laterally of, and at substantially the same level as, the said supply duct, means for heating and humidifying the air circulating within said chamber and ducts, means for supplying said conditioned comestible treating air into said chamber, means for the introduction of smoke into said conditioned comestible treating air, and means remote from said chamber for maintaining a desired static pressure therein, comprising an exhaust duct connected to said return ducts remote from said chamber, and containing dampers automatically operated by a pressure regulating device operating in response to the differential pressure between the inside and outside of said chamber.

4. In a smoke oven adapted to process comestibles, means for automatically circulating therein conditioned comestible treating air at a predetermined temperature, humidity and static pressure, comprising a variable speed blower fan, a supply duct leading from said blower fan into said oven, said supply duct being centrally disposed within said oven adjacent to the ceiling thereof, and extending substantially the length of said oven, which supply duct within said oven is equipped with a plurality of downwardly opening nozzles, return ducts within said oven located laterally of and at substantially the same level as the said supply duct, a plurality of closable openings in said return ducts within said oven, a manifold connecting said return ducts to said blower fan, an exhaust duct leading from said manifold to the outer atmosphere, a damper means for closing said exhaust duct, a pressure regulator within the said oven automatically operating said damper means in said exhaust duct, a fresh air intake in said manifold, a damper means for closing said fresh air intake, a means for injecting moisture into the return duct, a valve in said moisture injection means, a humidity regulating means automatically operating said damper means in the fresh air intake and the valve in said moisture injection means, a means for heating the atmosphere in said manifold, means for regulating the temperature of the atmosphere in said manifold automatically operating said heating means, and means for injecting smoke into said manifold.

5. An apparatus for treating food products comprising a gaseous pressure circulating system including an enlarged treating chamber and supply and return flow maintaining means communicating with said chamber, charging means for adding fresh gaseous fluid to said system and discharge means for releasing used gaseous fluid from said system, and means for maintaining the static pressure in said chamber at a predetermined point by automatically regulating the release of gaseous fluid through said discharge means in response to the differential pressure between the inside and outside of said chamber.

6. An apparatus for treating food products comprising a gaseous pressure circulating system formed in part by an enlarged treating chamber and in part by supply and return flow maintaining means communicating with said chamber, means for adding fresh gaseous charge to said system, means for withdrawing used gaseous fluid from said system, means for adding moisture to said system, and means for controlling the humidity at a predetermined value in said treating chamber by automatically regulating the addition of said fresh gaseous charge and said moisture in response to the relative humidity in said chamber.

7. A method of treating food products which comprises circulating a gaseous treating medium in enveloping relation to the food products in an enlarged treating zone, charging fresh treating medium to said zone, discharging used treating medium from said zone and maintaining the static pressure in said zone at a predetermined point by automatically regulating the discharge of said used treating medium in response to the differential pressure between the inside and outside of said zone.

8. A method of treating food products which comprises circulating a gaseous treating medium in a closed circuit including an enlarged treating zone, causing the treating medium to envelope uniformly the food products in the enlarged zone, charging fresh treating medium to said circuit, discharging used medium from said circuit, adding moisture to said circuit and controlling the humidity at a predetermined value in said treating zone by automatically regulating the charging of said fresh treating medium and said moisture in response to the variations in relative humidity in said chamber.

9. A method of treating food products under controlled conditions of humidity and pressure which comprises circulating a gaseous treating medium in enveloping relation to the food products in an enlarged treating zone, charging fresh treating medium to said zone, discharging used treating medium from said zone, adding moisture to said zone, maintaining the pressure in said zone at a predetermined point by regulating the discharge of said used treating medium automatically in response to the differential pressure between the inside and outside of said zone and maintaining the humidity at a predetermined point in said zone by regulating the addition of moisture automatically in response to variations in humidity therein.

ROBERT H. TRINKLE.